A. EDMISTER.
Corn Planter and Cultivator.

No. 83,943.

Patented Nov. 10, 1868.

Witnesses:
Wm. A. Morgan.
G. C. Cotton.

Inventor,
A. Edmister
per Munn &co
Attorneys

ALFRED EDMISTER, OF WESTFIELD, OHIO.

*Letters Patent No. 83,943, dated November 10, 1868.*

IMPROVEMENT IN CORN-PLANTER AND CULTIVATOR.

The Schedule referred to in these Letters Patent and making part of the same.

*To all whom it may concern:*

Be it known that I, ALFRED EDMISTER, of Westfield, in the county of Morrow, and State of Ohio, have invented a new and useful Improvement in Combined Corn-Planter and Cultivator; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish a simple, convenient, and effective machine, which may be easily and conveniently adjusted for use as a corn-planter or cultivator, and which will do its work thoroughly and well in either capacity; and it consists in the construction and combination of various parts of the machine, as hereinafter more fully described.

A is the frame of the machine, to the forward part of which are attached the tongue and draught-bars, in the ordinary manner.

B is the axle, which revolves in bearings attached to the frame A.

C are the wheels, which revolve loosely upon the axle B, and which are made to carry the said axle with them in their revolution, by means of the clutches D, which slide upon the axle B, and are held up against the hubs of the said wheels C by the coiled springs E, one end of which rests against a shoulder or flange formed upon the said axle, and the other ends of which rest against the inner sides of the clutches D.

Figure 1:
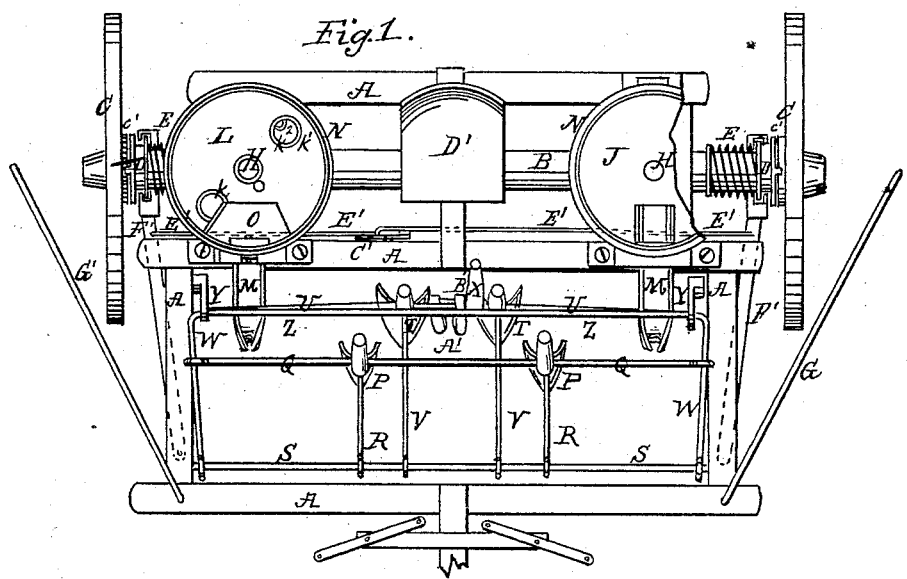
Figure 1 is a top view of my improved machine, part being broken away to show the construction.

Upon the outer sides of the clutch D is formed one or more catches or teeth, which take hold of the teeth $c'$, formed upon or attached to the inner ends of the hubs of the wheels C, as shown in fig. 1.

F are bevel-gear wheels attached to the axle B, the teeth of which mesh into the teeth of the bevel-gear wheels G, attached to the vertical shafts H, which revolve in supports, I, attached to the frame A.

The upper part of the shafts H passes up through the circular plates J, which rest upon and are secured to the supports I.

To the upper ends of the vertical shafts H are attached the circular valve and tube-plates K. The plates K have two or more openings or holes formed through them, according to the distance apart at which it is desired to have the hills.

In the openings in the plate $k$ are secured short upwardly-projecting tubes, $k^1$, which project upward through the gauge-wheels L, which are placed directly above the plates K, and are raised and lowered by set-screws, so as to so adjust the length of the tubes $k^1$ that they may hold the exact amount required for a hill.

Figure 2:
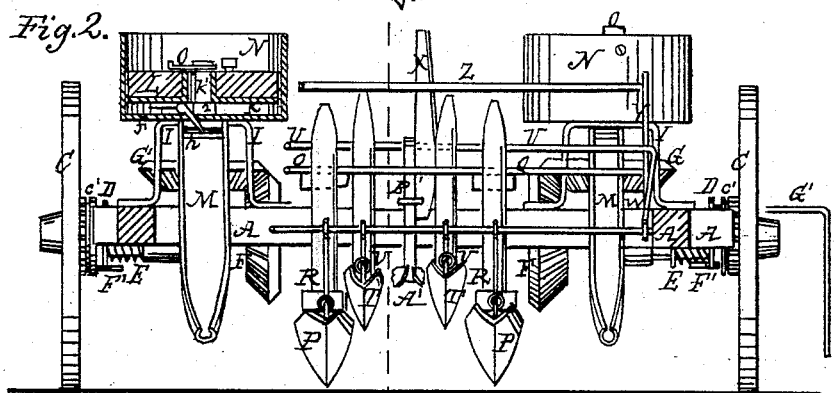
Figure 2 is a front view of the same, parts being broken away to show the construction.
Figure 3:
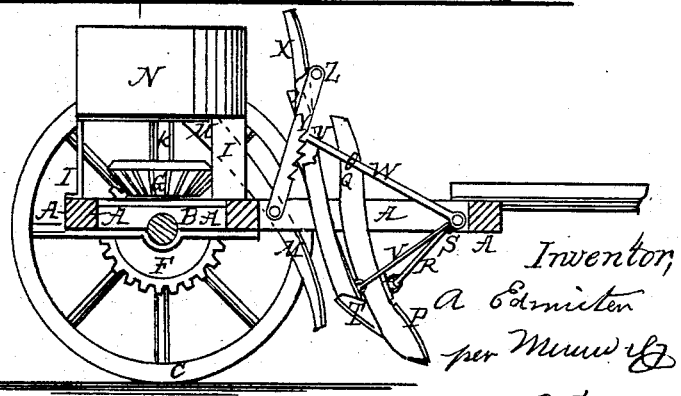
Figure 3 is a vertical cross-section of the same, taken through the line $x\,x$, fig. 2.

The openings through the plate K are closed by the drop or valve-plates $k^2$, which are hinged to the said plate K, as shown in fig. 2.

As the valve-plate K is carried around by the revolution of the vertical shaft H, the valves $k^2$ are held up to their places by sliding along the plates J until they come directly over the conductor or spout M, when they drop through an opening in said plate, allowing the corn to slide down the said spout to the ground.

N are the seed-boxes, which surround the tube-plates K and gauge-wheel L.

O are guard-plates, which are attached to the sides of the seed-boxes N, directly above the conductors M, so as to prevent the corn from entering the tubes $k^1$, while the valves at the lower end of said tubes are open.

P are plows, the standards of which hang upon the rod or bar Q, to which, when adjusted, they are secured by keys or other easily-detachable means.

The draught-strain upon the plows P is sustained by the connecting-rods R, the forward ends of which slide upon the rod or bar S, the ends of which are secured to the side-bars of the frame A.

T are plows, the standards of which hang upon and are keyed or otherwise adjustably secured to the rod or bar U. The draught-strain upon the plows T is sustained by the rods V, the forward ends of which slide upon the rod or bar S.

The ends of the rod or bars Q and U are attached to or formed upon the rear parts of the side-rods or bars W, the forward ends of which are pivoted to the bars S, as shown in the drawings, so that the plows may all be raised or lowered at the same time by means of the lever or handle X, secured to one of the rods or bars Q U.

Y are bars or plates, the lower ends of which are pivoted to the frame A, and the forward edges of which are notched or have teeth formed upon them, to take hold of the bar U, to hold the plows securely in any position to which they may be adjusted.

The upper ends of the bars or plates Y are connected by the rod Z, which also serves as a handle for operating the said notched bars Y.

A' are guard-plates attached to a standard, B', which is secured to the rod U. The rear parts of the plates A' curve outward, and are provided with fingers or prongs.

The plates A' are designed to prevent clods from being thrown against the plants by the action of the plows, and to turn the said clods back into the furrows formed by said plows, the fingers of the said plates allowing the fine sort to pass in around the said plants.

C' is a lever pivoted to the frame A, and the upper end of which extends up into such a position as to be conveniently reached and operated by the driver from his seat D'.

E' are two rods, the inner ends of which are pivoted to the lower part of the lever C', and the outer ends of which are pivoted to the levers F'. The forward ends of the levers F' are pivoted to the forward part of the frame A, and their rear ends are curved to pass beneath the axle B, and are so formed as to enter a groove in the sliding clutches D, so that the driver, from his seat, may conveniently operate the said clutches to throw the dropping-device out of gear.

G' are rods, the forward ends of which are attached to the forward part of the frame A, and the rear ends of which are bent downward, so as to gauge the spaces between the rows.

The drawings represent the plows arranged for use as a cultivator.

When the machine is to be used as a planter, the plows P are adjusted so as to be directly in front of the spouts M, and the seed is delivered into the furrow directly in the rear of the said plows.

In this case the plows T are adjusted into such a position as to fill up the furrows opened by the plows P and cover the seed.

Having thus described my invention,

I claim as new, and desire to secure by Letters Patent—

1. The combination and arrangement of the plows P and T, draught-rods R V, and rods or bars Q U W S, with each other and with the frame A, to enable the machine to be conveniently adjusted for use as a planter or cultivator, substantially as herein shown and described, and for the purpose set forth.

2. The combination and arrangement of the seed-box N, guard-plate O, gauge-wheel L, tube and valve-plate $k$, disk J, vertical shaft H, operated from the axle B, by means of the bevel-gear wheels F and G, and the conductor or spout M, with each other, substantially as herein shown and described, and for the purpose set forth.

3. The combination of the pivoted notched bars Y, connecting-rod Z, and lever or handle X, with the bars or rods U Q W, from which the plows P and T are suspended, substantially as herein shown and described, and for the purpose set forth.

Witnesses:
S. BROWN,
DANIEL BENSON.

ALFRED EDMISTER.